(12) United States Patent
McMahon (10) Patent No.: US 10,835,794 B1
(45) Date of Patent: Nov. 17, 2020

(54) BEAN BAG TOSSING GAME ASSEMBLY

(71) Applicant: Sean McMahon, Crown Point, IN (US)

(72) Inventor: Sean McMahon, Crown Point, IN (US)

( * ) Notice: Subject to any disclaimer, the term of this patent is extended or adjusted under 35 U.S.C. 154(b) by 0 days.

(21) Appl. No.: 16/432,132

(22) Filed: Jun. 5, 2019

(51) Int. Cl.
    *A63B 67/06*      (2006.01)
    *G01B 5/14*      (2006.01)
    *G01B 3/1056*      (2020.01)
    *G01B 3/1071*      (2020.01)

(52) U.S. Cl.
    CPC ............ *A63B 67/06* (2013.01); *G01B 3/1056* (2013.01); *G01B 3/1071* (2013.01); *G01B 5/14* (2013.01); *A63B 2225/02* (2013.01)

(58) Field of Classification Search
    USPC ........................................................ 273/402
    See application file for complete search history.

(56) References Cited

U.S. PATENT DOCUMENTS

| | | | |
|---|---|---|---|
| 475,470 A * | 5/1892 | Roe | |
| 1,638,914 A | 8/1927 | Brush | |
| 3,834,030 A | 9/1974 | Hanson | |
| 4,353,167 A | 10/1982 | Martin | |
| 4,938,485 A | 7/1990 | Hockridge | |
| 4,943,065 A * | 7/1990 | DeLapa | A63B 67/06 273/402 |
| 5,253,421 A | 10/1993 | Landmark | |
| 5,318,308 A * | 6/1994 | Holms | A63B 67/06 273/336 |
| D360,838 S | 8/1995 | Lin | |
| D375,125 S | 10/1996 | Mallek | |
| 5,575,483 A * | 11/1996 | Dineen | A63B 67/06 273/317.2 |
| 5,871,216 A * | 2/1999 | Sparacino | A63B 63/08 273/402 |
| 6,442,860 B1 * | 9/2002 | Williams | B25H 7/04 33/668 |
| 6,754,974 B2 | 6/2004 | Bassolino | |
| 6,932,344 B1 * | 8/2005 | Soto | A63B 67/06 273/336 |
| 7,024,792 B2 | 4/2006 | Graham | |
| 7,237,777 B2 * | 7/2007 | Digges, III | A63B 67/06 273/400 |
| 7,854,528 B2 * | 12/2010 | Segretto | A63B 63/08 273/402 |
| 8,746,700 B1 * | 6/2014 | Capone, Jr. | A63B 67/06 273/236 |
| 9,364,732 B2 * | 6/2016 | Endreszl | A63B 63/00 |
| 9,381,414 B1 * | 7/2016 | Gatton | A63B 67/06 |
| 9,623,307 B1 * | 4/2017 | Devor | A63B 67/06 |
| D827,031 S * | 8/2018 | Valladares | D21/303 |
| 10,065,095 B2 * | 9/2018 | Gallagher | A63B 63/007 |
| 10,265,596 B2 * | 4/2019 | Skala | A63B 67/06 |
| 10,286,276 B2 * | 5/2019 | O'Neill | F21V 3/0625 |
| 10,434,392 B1 * | 10/2019 | Riegel | A63B 67/06 |
| 2005/0127609 A1 * | 6/2005 | Raslowsky | A63B 63/007 273/402 |

(Continued)

*Primary Examiner* — John E Simms, Jr.
*Assistant Examiner* — Dolores R Collins (57) ABSTRACT

A bean bag tossing game assembly for achieving a desired separation between platforms includes a first platform and a tape measure. The tape measure is coupled to the first platform. A tape of the tape measure is selectively extensible so that the tape measure is configured to measure a distance between the first platform and a second platform to achieve a desired separation between the first platform and the second platform.

10 Claims, 6 Drawing Sheets

(56) References Cited

U.S. PATENT DOCUMENTS

| | | | |
|---|---|---|---|
| 2006/0125186 A1* | 6/2006 | Digges, III | A63B 67/06 273/402 |
| 2006/0255537 A1* | 11/2006 | Gandley | A63F 7/00 273/126 R |
| 2007/0090499 A1* | 4/2007 | Tanaka | H01L 23/49562 257/666 |
| 2008/0042360 A1* | 2/2008 | Veikley | A63B 67/06 273/398 |
| 2008/0116644 A1* | 5/2008 | Knoernschild | A63B 67/06 273/336 |
| 2008/0157476 A1* | 7/2008 | Striebel | A63B 63/00 273/402 |
| 2009/0115136 A1* | 5/2009 | Voden | A63B 21/0053 273/336 |
| 2011/0179662 A1* | 7/2011 | Donovan | B25B 5/06 33/758 |
| 2011/0215528 A1* | 9/2011 | Conville | A63B 67/06 273/402 |
| 2012/0038108 A1* | 2/2012 | McLaughlin, Jr. | A63B 63/08 273/402 |
| 2014/0091526 A1* | 4/2014 | Nally | A63B 63/08 273/402 |
| 2014/0165414 A1* | 6/2014 | Smith | G01B 3/1056 33/768 |
| 2014/0310969 A1* | 10/2014 | Moreau | G01B 3/1041 33/769 |
| 2014/0374992 A1* | 12/2014 | Reile | A63B 67/06 273/402 |
| 2015/0054221 A1* | 2/2015 | Sandman | A63B 67/06 273/402 |
| 2015/0108719 A1* | 4/2015 | Devine | A63B 63/08 273/402 |
| 2015/0321060 A1* | 11/2015 | Nuessle | A63B 67/02 273/317.2 |

* cited by examiner

BEAN BAG TOSSING GAME ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to game assemblies and more particularly pertains to a new game assembly for achieving a desired separation between platforms.

BRIEF SUMMARY OF THE INVENTION

An embodiment of the disclosure meets the needs presented above by generally comprising a first platform and a tape measure. The tape measure is coupled to the first platform. A tape of the tape measure is selectively extensible so that the tape measure is configured to measure a distance between the first platform and a second platform to achieve a desired separation between the first platform and the second platform.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

With reference now to the drawings, and in particular to FIGS. 1 through 7 thereof, a new game assembly embodying the principles and concepts of an embodiment of the disclosure and generally designated by the reference numeral 10 will be described.

As best illustrated in FIGS. 1 through 7, the bean bag tossing game assembly 10 generally comprises a first platform 12, a second platform 14, and a tape measure 16. The first platform 12 comprises a vertical member 18 and an angled member 20 so that the first platform 12 is substantially wedge shaped. The second platform 14 comprises an upright member 22 and an angular member 24 so that the second platform 14 also is substantially wedge shape. The tape measure 16 is coupled to the first platform 12. A tape 26 of the tape measure 16 is selectively extensible so that the tape measure 16 is configured to measure a distance between the first platform 12 and the second platform 14 to achieve a desired separation between the first platform 12 and the second platform 14.

A coupler 28 is coupled to the first platform 12. The coupler 28 is positioned to selectively couple to the tape measure 16 so that the tape measure 16 is coupled to the first platform 12. The coupler 28 is coupled to a lower face 30 of the angled member 20 proximate to the vertical member 18 so that the tape is configured to be extended through a first hole 32 that is positioned in the angled member 20 to a centerpoint 34 of a second hole 36 that is positioned in the angular member 24 of the second platform 14, allowing a user to achieve the desired separation between the first platform 12 and the second platform 14.

The coupler 28 comprises a first plate 38, a second plate 40, and a third plate 42. The first plate 38 is coupled to and extends perpendicularly from the lower face 30 of the angled member 20. The second plate 40 is coupled to and extends perpendicularly from the first plate 38 distal from the angled member 20. The third plate 42 is coupled to and extends from the lower face 30 of the angled member 20 so that the third plate 42 is parallel to the first plate 38. The first plate 38, the second plate 40, and the third plate 42 define a slot 44 that is substantially complementary to the tape measure 16. The third plate 42 and the second plate 40 define an opening 46. The tape measure 16 is insertable into the slot 44 with a clip 48 of the tape measure 16 positioned to couple to the third plate 42 to couple the tape measure 16 to the first platform 12.

A hook 50 is coupled to an end 52 of the tape 26. An aperture 54 is positioned in the hook 50. A strap 56, which comprises a zip tie 58, is coupled to the hook 50 and is configured to be grasped in a hand of a user to extend the tape 26 from the tape measure 16.

Figure 1:
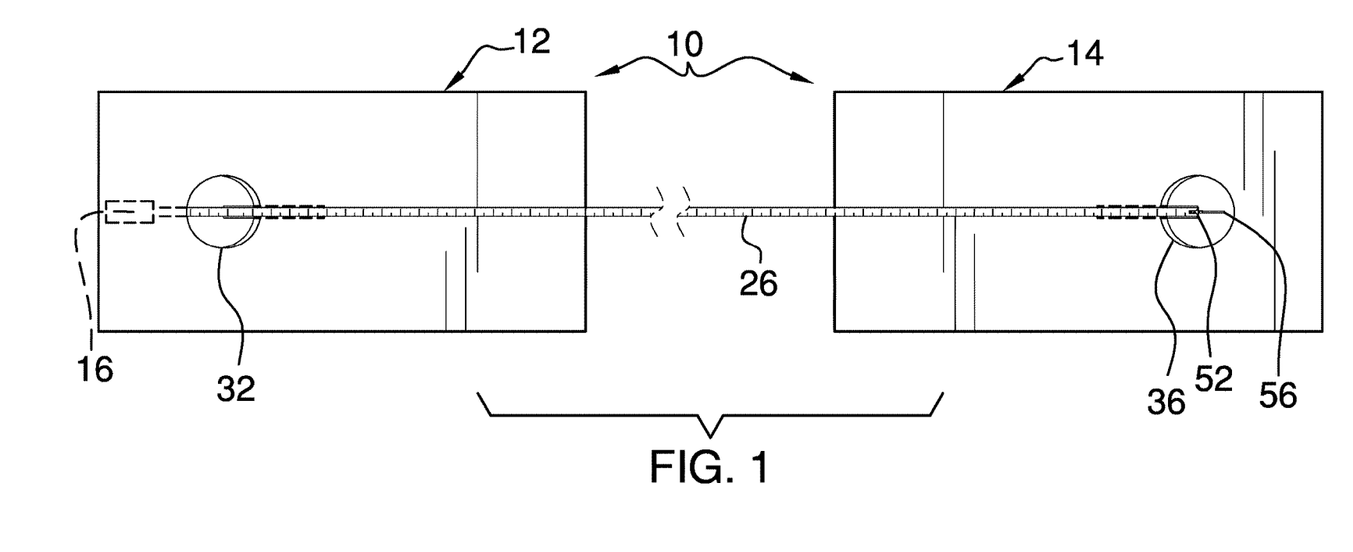
FIG. 1 is a top view of a bean bag tossing game assembly according to an embodiment of the disclosure.
Figure 2:
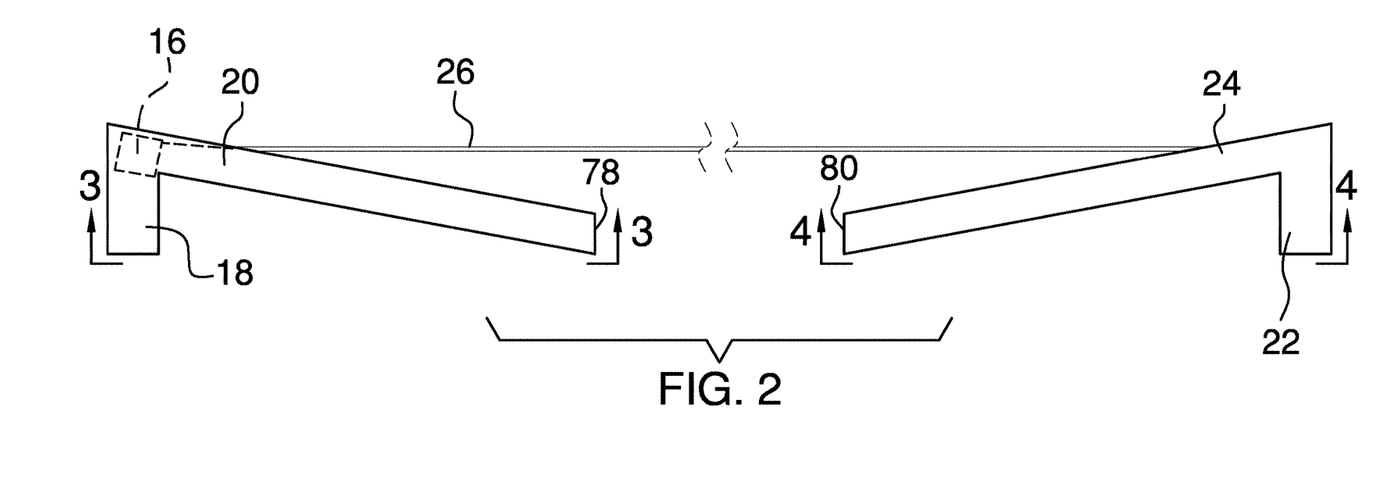
FIG. 2 is a side view of an embodiment of the disclosure.
Figure 3:
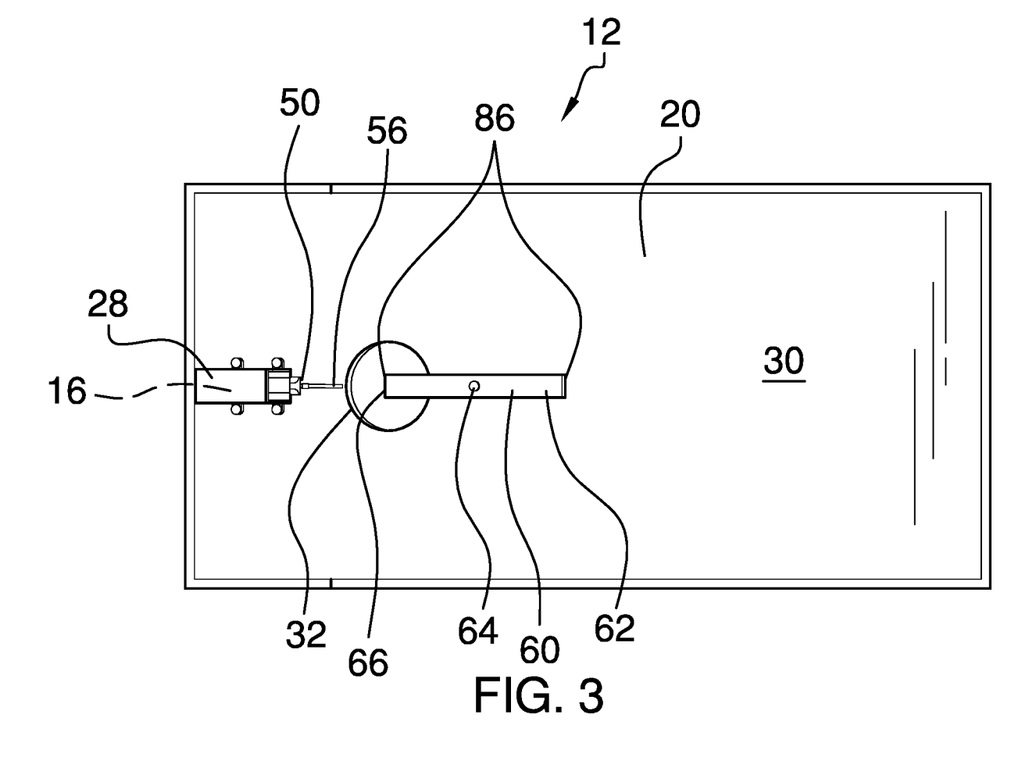
FIG. 3 is a bottom view of an embodiment of the disclosure.

A first slat 60, which comprises a first ruler 62, is rotationally coupled by a midpoint 64 to the lower face 30 of the angled member 20 proximate to the first hole 32, as shown in FIG. 3. The first slat 60 is selectively rotatable relative to the angled member 20 and is positioned to be rotated from a first position, wherein the first slat 60 is substantially parallel to the vertical member 18, to a second position, wherein a respective opposing end 86 of the first slat 60 is positioned at a center 66 of the first hole 32.

Figure 4:
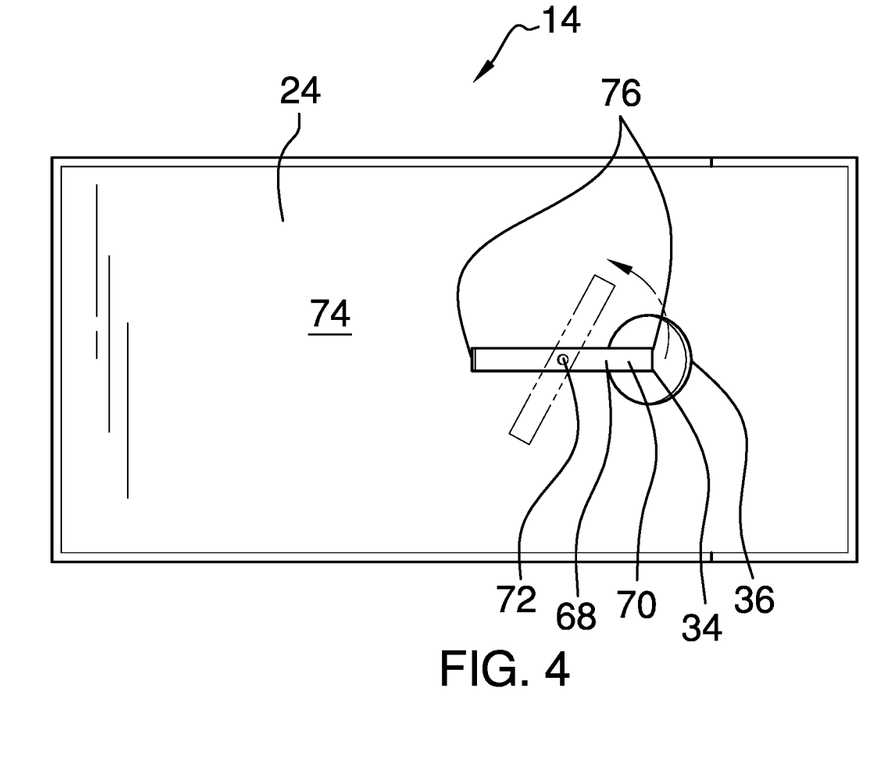
FIG. 4 is a bottom view of an embodiment of the disclosure.
Figure 5:
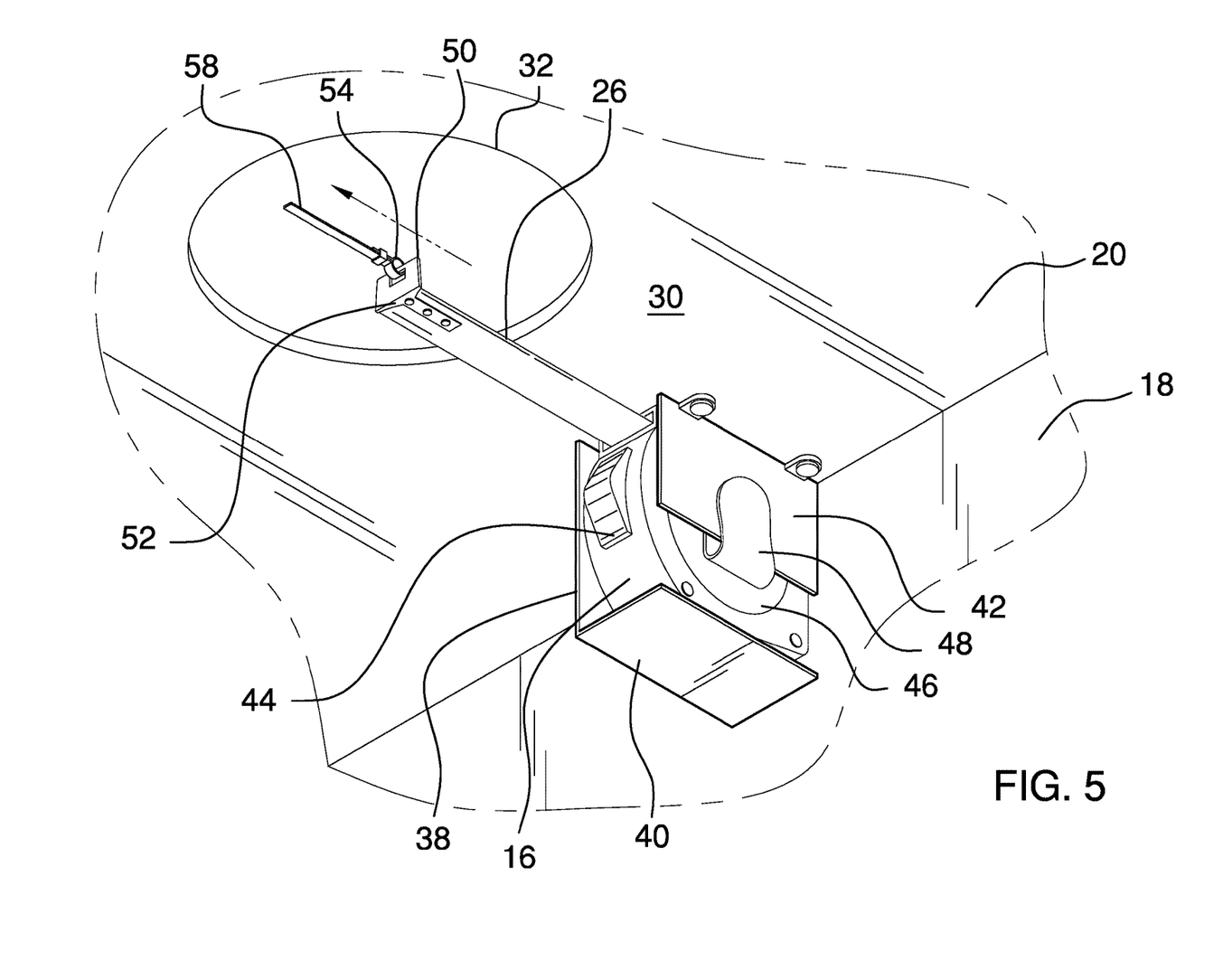
FIG. 5 is a detail view of an embodiment of the disclosure.

A second slat 68, which comprises a second ruler 70, is rotationally coupled by a middle point 72 to a lower surface 74 of the angular member 24 of the second platform 14, as shown in FIG. 4. The second slat 68 is selectively rotatable relative to the angular member 24 and is positioned to be rotated from a first setting, wherein the second slat 68 is substantially parallel to the upright member 22 of the second platform 14, and a second setting, wherein a respective opposing endpoint 76 of the second slat 68 is positioned at the centerpoint 34 of the second hole 36. With the center 66 of the first hole 32 identified by the first ruler 62 and the centerpoint 34 of the second hole 36 identified by the second ruler 70, the user is positioned to achieve the desired separation between the first platform 12 and the second platform 14.

The assembly 10 pertains generally to a game commonly known as cornhole. The Official Cornhole Rules promulgated by the American Cornhole Organization state that the separation between the first platform 12 and the second platform 14 shall be 33 feet between the center 66 of the first hole 32 that is positioned in the first platform 12 and the centerpoint 34 of the second hole 36 that is positioned in the second platform 14. The task of measuring the distance between the center 66 of the first hole 32 and the centerpoint 34 of a second hole 36 is readily achieved using the embodiment of the invention described above. The distance of 33 feet between the center 66 of the first hole 32 and the centerpoint 34 of a second hole 36 corresponds to a distance of 27 feet from a front face 78 of the first platform 12 to a forward face 80 of the second platform 14. This measurement is readily achieved using another embodiment of the invention, described below and shown in FIGS. 6 and 7.

Figure 6:
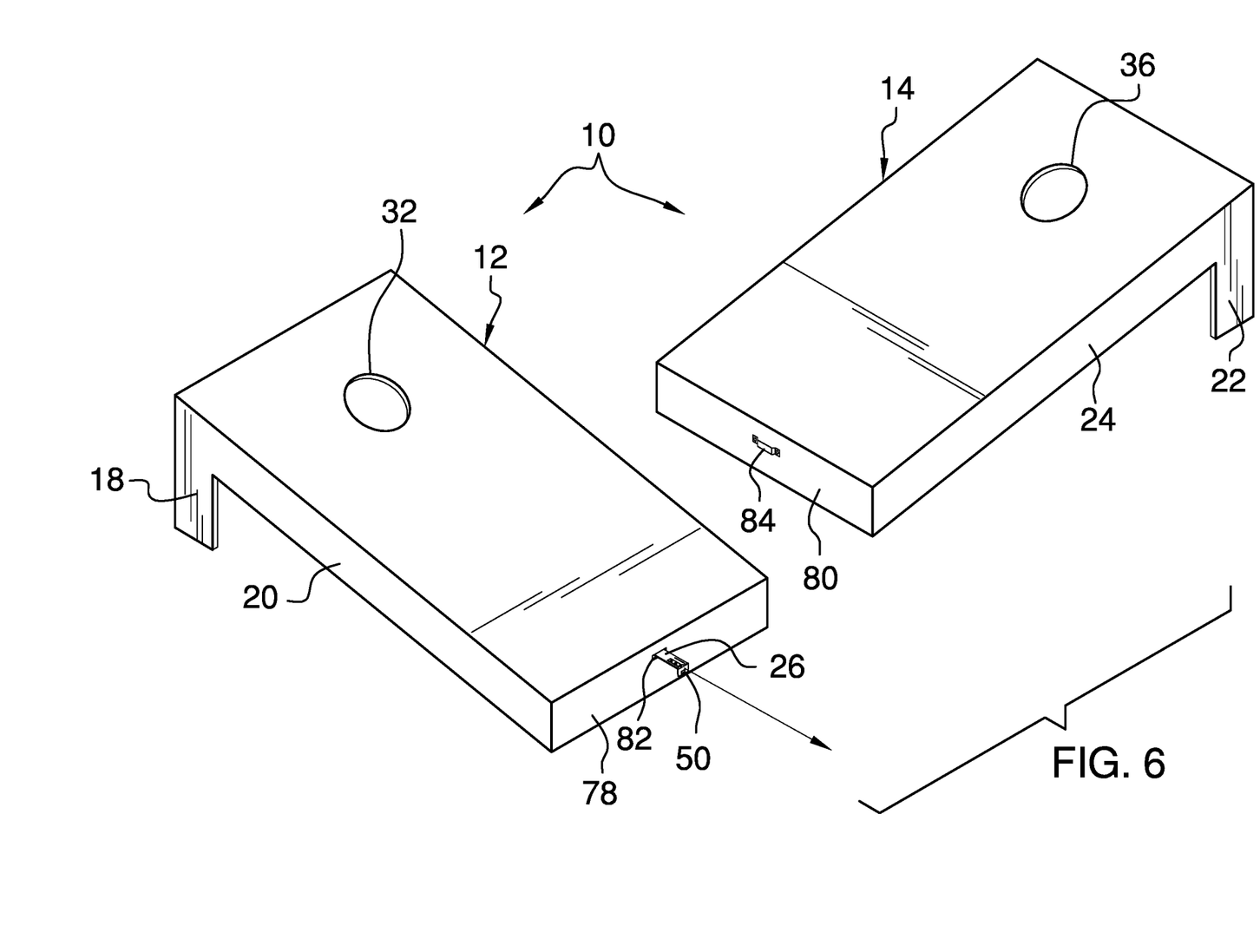
FIG. 6 is an isometric perspective view of an embodiment of the disclosure.
Figure 7:
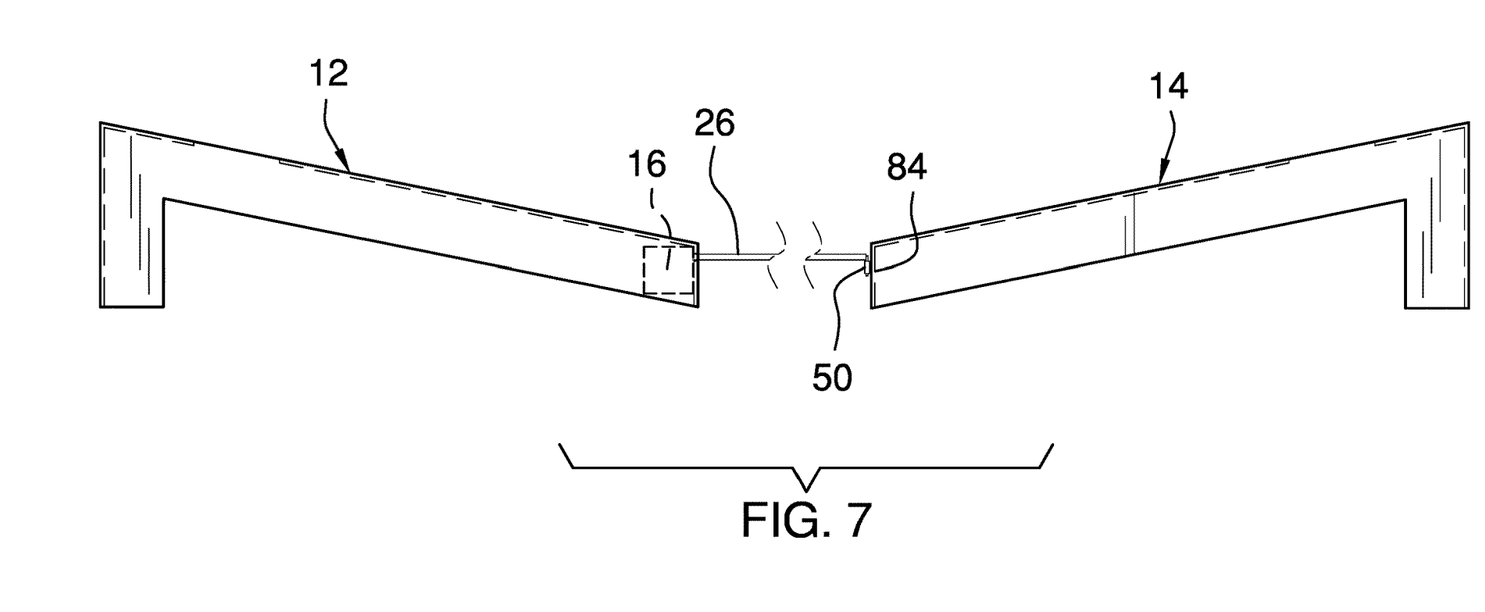
FIG. 7 is a side view of an embodiment of the disclosure.

In this embodiment, the coupler 28 is coupled to the lower face 30 of the angled member 20 proximate to the front face 78 of the first platform 12 so that the tape 26 of the tape measure 16 extends through a slit 82 that is positioned in the front face 78. The hook 50 abuts the front face 78 and is configured to be grasped in digits of the hand of the user to extend the tape 26 through the slit 82.

A bracket 84 is coupled to the forward face 80 of the second platform 14. The bracket 84 is positioned to selectively couple to the hook 50 to couple the tape 26 between the first platform 12 and the second platform 14, positioning the user to adjust the distance between the first platform 12 and the second platform 14 to achieve the desired separation between the first platform 12 and the second platform 14.

In use, the first platform 12 and the second platform 14 are positioned at a separation approximate to that desired by the user. The tape 26 then is extended from the tape measure 16 through the first hole 32 to the second hole 36. The distance between the center 66 of the first hole 32 and the centerpoint 34 of the second hole 36 is determined, with the aid of the first ruler 62 and the second ruler 70, allowing the user to adjust the separation between the first platform 12 and the second platform 14 to achieve the desired separation.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A bean bag tossing game assembly comprising:
   a first platform, the first platform comprising a vertical member and an angled member such that the first platform is substantially wedge shaped;
   a tape measure coupled to the first platform, a tape of the tape measure being selectively extensible wherein the tape measure is configured for measuring a distance between the first platform and a second platform for achieving a desired separation between the first platform and the second platform, the second platform comprising an upright member and an angular member such that the second platform is substantially wedge shaped;
   a first slat rotationally coupled by a midpoint to the lower face of the angled member proximate to the first hole such that the first slat is selectively rotatable relative to the angled member wherein the first slat is positioned for rotating from a first position wherein the first slat is substantially parallel to the vertical member and a second position wherein a respective opposing end of the first slat is positioned at a center of the first hole; and
   a second slat rotationally coupled by a middle point to a lower surface of the angular member of the second platform such that the second slat is selectively rotatable relative to the angular member wherein the second slat is positioned for rotating from a first setting wherein the second slat is substantially parallel to the upright member of the second platform and a second setting wherein a respective opposing endpoint of the second slat is positioned at a centerpoint of a second hole positioned in the angular member of the second platform.

2. The assembly of claim 1, further including a coupler coupled to the first platform, the coupler being positioned for selectively coupling to the tape measure such that the tape measure is coupled to the first platform.

3. The assembly of claim 1, further including the coupler being coupled to a lower face of the angled member proximate to the vertical member such that the tape is configured for extending through a first hole positioned in the angled member.

4. The assembly of claim 3, further including the coupler comprising a first plate, a second plate and a third plate, the first plate being coupled to and extending perpendicularly from the lower face of the angled member, the second plate being coupled to and extending perpendicularly from the first plate distal from the angled member, the third plate being coupled to and extending from the lower face of the angled member such that the third plate is parallel to the first plate wherein the first plate, the second plate and the third plate define a slot substantially complementary to the tape measure and wherein the third plate and the second plate define an opening such that the tape measure is insertable into the slot with a clip of the tape measure positioned for coupling to the third plate for coupling the tape measure to the first platform.

5. The assembly of claim 4, further comprising:
a hook coupled to an end of the tape; and
a strap coupled to the hook wherein the strap is configured for grasping in a hand of a user for extending the tape from the tape measure.

6. The assembly of claim 5, further comprising:
an aperture positioned in the hook; and
the strap comprising a zip tie.

7. The assembly of claim 1, further comprising:
the first slat comprising a first ruler; and
the second slat comprising a second ruler.

8. The assembly of claim 1, further comprising:
the coupler being coupled to the lower face of the angled member proximate to a front face of the first platform such that the tape of the tape measure extend through a slit positioned in the front face and such that the hook abuts the front face wherein the hook is configured for grasping in digits of a hand of a user for extending the tape through the slit; and
a bracket coupled to a forward face of the second platform wherein the bracket is positioned for selectively coupling to the hook for coupling the tape between the first platform and the second platform positioning the user for adjusting the distance between the first platform and the second platform for achieving the desired separation between the first platform and the second platform.

9. A bean bag tossing game assembly comprising:
a first platform, the first platform comprising a vertical member and an angled member such that the first platform is substantially wedge shaped;
a second platform, the second platform comprising an upright member and an angular member such that the second platform is substantially wedge shape;
a tape measure coupled to the first platform, a tape of the tape measure being selectively extensible wherein the tape measure is configured for measuring a distance between the first platform and the second platform for achieving a desired separation between the first platform and the second platform;
a coupler coupled to the first platform, the coupler being positioned for selectively coupling to the tape measure such that the tape measure is coupled to the first platform, the coupler being coupled to a lower face of the angled member proximate to the vertical member such that the tape is configured for extending through a first hole positioned in the angled member, the coupler comprising a first plate, a second plate and a third plate, the first plate being coupled to and extending perpendicularly from the lower face of the angled member, the second plate being coupled to and extending perpendicularly from the first plate distal from the angled member, the third plate being coupled to and extending from the lower face of the angled member such that the third plate is parallel to the first plate wherein the first plate, the second plate and the third plate define a slot substantially complementary to the tape measure and wherein the third plate and the second plate define an opening such that the tape measure is insertable into the slot with a clip of the tape measure positioned for coupling to the third plate for coupling the tape measure to the first platform;
a hook coupled to an end of the tape;
a strap coupled to the hook wherein the strap is configured for grasping in a hand of a user for extending the tape from the tape measure;
an aperture positioned in the hook, the strap comprising a zip tie;
a first slat rotationally coupled by a midpoint to the lower face of the angled member proximate to the first hole such that the first slat is selectively rotatable relative to the angled member wherein the first slat is positioned for rotating from a first position wherein the first slat is substantially parallel to the vertical member and a second position wherein a respective opposing end of the first slat is positioned at a center of the first hole, the first slat comprising a first ruler; and
a second slat rotationally coupled by a middle point to a lower surface of the angular member of the second platform such that the second slat is selectively rotatable relative to the angular member wherein the second slat is positioned for rotating from a first setting wherein the second slat is substantially parallel to the upright member of the second platform and a second setting wherein a respective opposing endpoint of the second slat is positioned at a centerpoint of a second hole positioned in the angular member of the second platform, the second slat comprising a second ruler.

10. The assembly of claim 9, further comprising:
the coupler being coupled to the lower face of the angled member proximate to a front face of the first platform such that the tape of the tape measure extend through a slit positioned in the front face and such that the hook abuts the front face wherein the hook is configured for grasping in digits of a hand of a user for extending the tape through the slit; and
a bracket coupled to a forward face of the second platform wherein the bracket is positioned for selectively coupling to the hook for coupling the tape between the first platform and the second platform positioning the user for adjusting the distance between the first platform and the second platform for achieving the desired separation between the first platform and the second platform.

\* \* \* \* \*